(12) United States Patent
Zheng

(10) Patent No.: US 8,331,245 B2
(45) Date of Patent: Dec. 11, 2012

(54) METHOD AND SYSTEM FOR IP SESSION KEEPALIVE MONITORING, HOME GATEWAY AND NETWORK DEVICE

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 34 days.

(21) Appl. No.: 13/187,972

(22) Filed: Jul. 21, 2011

(65) Prior Publication Data

US 2011/0280134 A1 Nov. 17, 2011

Related U.S. Application Data

(63) Continuation of application No. PCT/CN2010/070161, filed on Jan. 13, 2010.

(30) Foreign Application Priority Data

Jan. 21, 2009 (CN) .......................... 2009 1 0001997

(51) Int. Cl.
*H04L 1/00* (2006.01)
(52) U.S. Cl. ..................................... 370/241.1; 709/228
(58) Field of Classification Search .......................... None
See application file for complete search history.

(56) References Cited

U.S. PATENT DOCUMENTS

| | | | | |
|---|---|---|---|---|
| 7,860,981 | B1 * | 12/2010 | Vinokour et al. | ............. 709/227 |
| 2004/0240468 | A1 | 12/2004 | Chin et al. | |
| 2004/0264381 | A1 * | 12/2004 | Banerjee et al. | ............... 370/252 |
| 2007/0073891 | A1 | 3/2007 | Foltan et al. | |
| 2008/0247324 | A1 * | 10/2008 | Nadeau et al. | ................ 370/245 |

FOREIGN PATENT DOCUMENTS

| | | |
|---|---|---|
| CN | 101304367 A | 11/2008 |
| CN | 101312456 A | 11/2008 |
| JP | 2008544637 A | 12/2008 |
| JP | 2009016905 A | 1/2009 |
| WO | WO 2008/067760 A1 | 6/2008 |
| WO | WO 2008/141572 A1 | 11/2008 |

OTHER PUBLICATIONS

Written Opinion of the International Searching Authority in corresponding PCT Application No. PCT/CN2010/070161 (Apr. 22, 2010).

(Continued)

*Primary Examiner* — Jianye Wu
(74) *Attorney, Agent, or Firm* — Leydig, Voit & Mayer, Ltd.

(57) ABSTRACT

A method and a system for Internet Protocol (IP) session keepalive monitoring, a home gateway and a network device are provided. The method includes: receiving, by a User Equipment (UE) or an IP edge node, a Bidirectional Forwarding Detection (BFD) message sent by a Home Gateway (HGW), in which a first discriminator field value included in the BFD message is a difference between an IP address prefix of the UE and an IP address prefix of the HGW; and monitoring, by the UE or the IP edge node, whether an IP session between the IP edge node and the UE is keepalive according to the first discriminator field value in the BFD message. "Multihop BFD" is used as a keepalive monitoring mechanism of a "Multihop IPv6 Session", thereby realizing keepalive monitoring of the "Multiple hop IPv6 Session".

11 Claims, 3 Drawing Sheets

OTHER PUBLICATIONS

Extended European Search Report in corresponding European Application No. 10733212.4 (Aug. 25, 2011).
Katz et al., "BFD for Multihop Paths draft-ietf-bdf-multihop-06.txt," Network Working Group Internet Draft, Jan. 2008, The Internet Society, Reston, Virginia.
International Search Report in corresponding PCT Application No. PCT/CN2010/070161 (Apr. 22, 2010).
Office Action in corresponding Japanese Patent Application No. 2011-546574 (Jun. 26, 2012).

* cited by examiner

METHOD AND SYSTEM FOR IP SESSION KEEPALIVE MONITORING, HOME GATEWAY AND NETWORK DEVICE

CROSS-REFERENCE TO RELATED APPLICATIONS

This application is a continuation of International Application No. PCT/CN2010/070161, filed on Jan. 13, 2010, which claims priority to Chinese Patent Application No. 200910001997.1, filed on Jan. 21, 2009, both of which are hereby incorporated by reference in their entireties.

FIELD OF THE INVENTION

The present invention relates to the field of communications technologies, and in particular, to a method and a system for Internet Protocol (IP) session keepalive monitoring, a Home Gateway (HGW) and a network device.

BACKGROUND OF THE INVENTION

In an access network, an IP session represents a network access connection session associated with an IP address of a user, the "IP Session" and a Point-to-Point Protocol (PPP) session are peer-to-peer, and the "IP Session" and the "PPP Session" are collectively referred to as subscriber session. The PPP session adopts a particular PPP keepalive detecting mechanism, and an IPv4 session adopts a particular Bidirectional Forwarding Detection (BFD) or Address Resolution Protocol (ARP) keepalive detecting mechanism.

The "IP Session" is generally terminated on an IP edge node, such as a Broadband Network Gateway (BNG) or a Broadband Remote Access Server (BRAS), and the other side of the "IP Session" is generally terminated on a user device, such as an HGW, that is, the "IP Session" is a session connection established between the user device and the IP edge node, and is a single hop session. The "IP session" is used for a network to manage the access of users to the network, such as charging and status. The "IP Session" uses an IP address or an IP address prefix as an identifier of the "IP Session."

In the implementation of the present invention, the inventors find that at least the following problems exist in the prior art: In the prior art, an HGW under the IPv4 supports Network Address Translation (NAT), and an "IPv4 Session" is a "Single IPv4 hop;" while an HGW under the IPv6 is a router, and generally does not support the NAT, and in this case, a user device on which the "IP Session" is terminated is not necessarily an HGW, and may be a User Equipment (UE) following the HGW, and at this time, the "IPv6 Session" needs to be extended to a "Multiple IPv6 hop," but no solution in the prior art solves how the UE following the HGW traverses the HGW to realize keepalive monitoring (Keepalive) of a "Multiple hop IPv6 Session."

SUMMARY OF THE INVENTION

Embodiments of the present invention provide a method and a system for IP session keepalive monitoring, an HGW and a network device, which realize keepalive monitoring of a "Multiple hop IPv6 Session."

In an embodiment, the present invention provides an IP session keepalive monitoring method, which includes:
receiving, by a UE or an IP edge node, a BFD message sent by an HGW, in which a first discriminator field value included in the BFD message is a difference between an IP address prefix of the UE and an IP address prefix of the HGW; and
monitoring, by the UE or the IP edge node, whether an IP session between the IP edge node and the UE is keepalive according to the first discriminator field value in the BFD message.

In an embodiment, the present invention provides an HGW, which includes:
a receiving module, configured to receive a BFD message sent by a UE or an IP edge node; and
a forwarding module, configured to send the BFD message including a first discriminator field value to the IP edge node or the UE according to the BFD message received by the receiving module, in which the first discriminator field value is a difference between an IP address prefix of the UE and an IP address prefix of the HGW.

In an embodiment, the present invention provides a network device, which includes:
a second receiving module, configured to receive a BFD message sent by an HGW, in which a first discriminator field value included in the BFD message is a difference between an IP address prefix of a UE and an IP address prefix of the HGW; and
a processing module, configured to monitor whether an IP session between an IP edge node and the UE is keepalive according to the first discriminator field value in the BFD message.

In the method and the system for IP session keepalive monitoring, the HGW and the network device according to the embodiments of the present invention, "Multihop BFD" is used as a keepalive monitoring mechanism of a "Multihop IPv6 Session," so that an "IPv6 Session" can be established between the UE following the HGW and the IP edge node, and a "Single hop IP Session" can be extended to a "Multihop IP Session," thereby realizing keepalive monitoring of the "Multiple hop IPv6 Session."

DETAILED DESCRIPTION OF THE EMBODIMENTS

The technical solutions according to the embodiments of the present invention are further illustrated in the following with reference to the accompanying drawings and specific embodiments.

Figure 1:
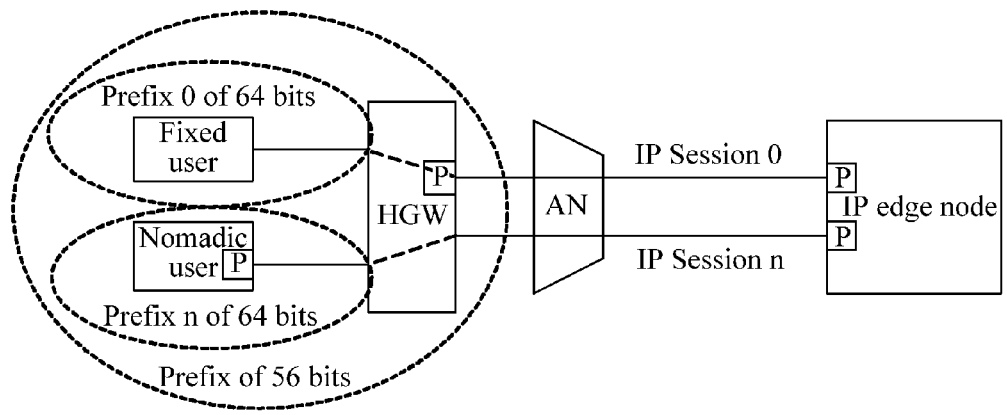
FIG. 1 is a schematic structural diagram of an "IPv6 Session" system according to the present invention.

FIG. 1 is a schematic structural diagram of an "IPv6 Session" system according to the present invention. As shown in FIG. 1, an HGW is a three-layer router, and realizes an "IPv6 Session Keepalive" (keepalive monitoring) "proxy" function. A plurality of UEs or a plurality of "IPv6 Sessions" may be bundled to form a UE group or an "IPv6 Session" group according to classification of management domains, geographic regions or services. An "IP Session 0" is a single hop "IPv6 Session" established between the HGW and a BNG with the HGW as a subscriber; an "IP Session n" is an "IPv6 Session" established between a UE (particularly a nomadic user) and a BNG with the UE as a Subscriber, the "IP Session n" is a multihop "Session," a hop from the UE to the HGW is a first hop, and a hop from the HGW to an "IP edge node" is a second hop; and the HGW applies for an address prefix through Dynamic Host Configuration Protocol (DHCP) Prefix Delegation (PD), for example, an address prefix "Prefix Z" of 56 bits. The HGW extends different sub-prefixes for the following UE through the "Prefix Z," for example, different users have different sub-prefixes of 64 bits, or a fixed user and a nomadic user have different sub-prefixes of 64 bits. The "IP Session" uses an IP address/prefix as an "IP Session" identifier, for example, the "IP Session 0" uses the "Prefix Z" of 56 bits as an identifier, and the "IP Session n" uses a "Prefix Yn" of 64 bits as an identifier, where n=1, 2, 3 . . . .

Figure 2:
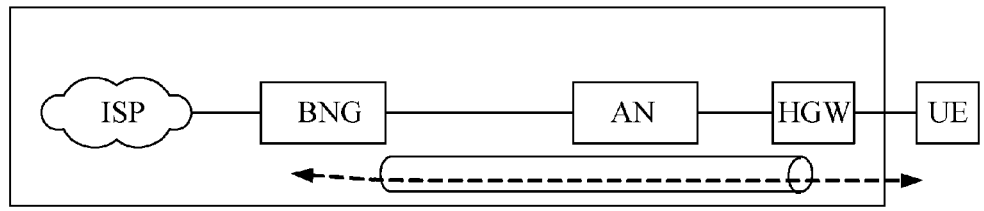
FIG. 2 is a schematic diagram of a "Multihop IPv6 Session" data plane according to the present invention.
Figure 3:
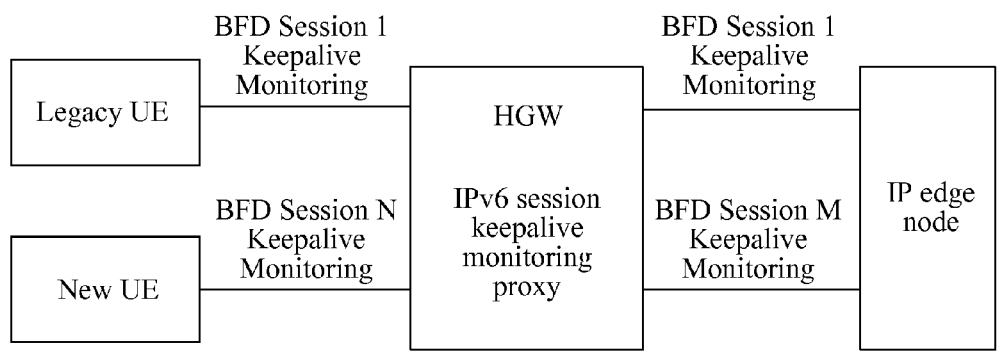
FIG. 3 is a schematic principle diagram of an "IPv6 Session" keepalive monitoring proxy according to the present invention.
Figure 4:
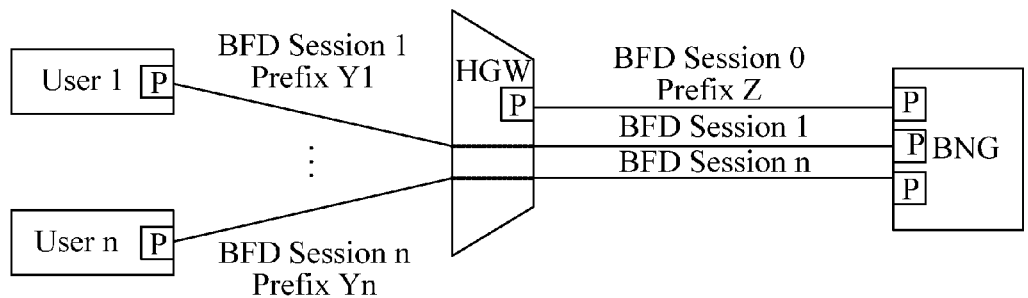
FIG. 4 is a schematic diagram of an IP session keepalive monitoring method according to a first embodiment of the present invention.
Figure 5:
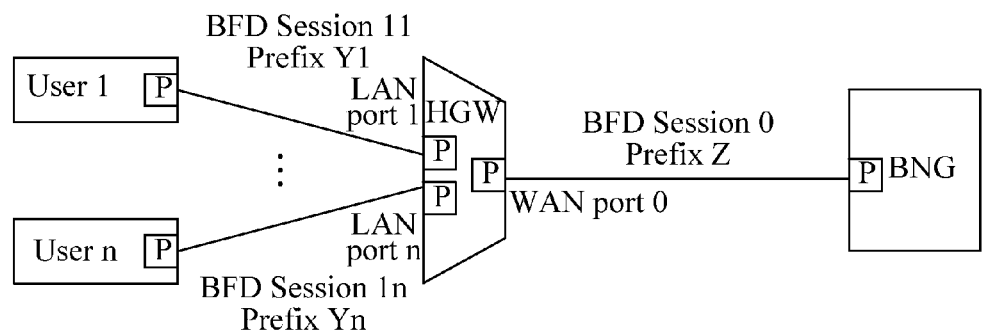
FIG. 5 is a schematic diagram of an IP session keepalive monitoring method according to a second embodiment of the present invention.
Figure 6:
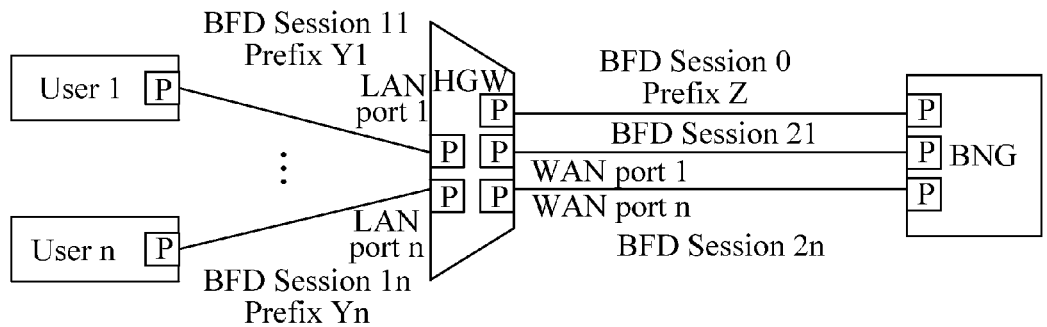
FIG. 6 is a schematic diagram of an IP session keepalive monitoring method according to a third embodiment of the present invention.

FIG. 2 is a schematic diagram of a "Multihop IPv6 Session" data plane according to the present invention. As shown in FIG. 2, on the data plane, a "Multihop IP Session" between a BNG and a UE is borne on a single hop "IP Session" between the BNG and an HGW. FIG. 3 is a schematic principle diagram of an "IPv6 Session" keepalive monitoring proxy according to the present invention. As shown in FIG. 4, FIG. 5 and FIG. 6, a block "P" represents a session peer, and the present invention mainly provides two solutions.

In Solution 1, "Multihop BFD" is used as a keepalive monitoring mechanism of a "Multihop IPv6 Session," a keepalive monitoring proxy (an IPv6 Session Keepalive Proxy) is disposed on the HGW, and a "Multihop BFD" protocol message is transparently transmitted or a discriminator field of the BFD protocol message is modified.

In Solution 2, an "IPv6 Session Keepalive Proxy" is disposed on the HGW, a "Legacy UE" performs "Session keepalive" of a first hop by adopting "Single hop Neighbor Unreachable Detection (NUD)"/"BFD", the BNG performs "Session keepalive" of a second hop by adopting "Single hop BFD," and the "IPv6 Session Keepalive Proxy" realizes keepalive relay from the NUD/BFD of the first hop to the BFD of the second hop. A plurality of UEs or a plurality of "IPv6 Sessions" may be bundled to form a UE group or an IPv6 Session group according to classification of management domains, geographic regions or services, a proxy may use different Wide Area Network (WAN) ports to correspond to different UE groups or "IPv6 Session" groups. Specially, when a UE group or an "IPv6 Session" group only contains one UE or "IPv6 Session," the proxy may use different WAN ports to correspond to different UEs or "IPv6 Sessions."

FIG. 4 is a schematic diagram of an IP session keepalive monitoring method according to a first embodiment of the present invention. In this embodiment, an "IPv6 Session Keepalive Proxy" disposed on an HGW realizes keepalive monitoring of a "Multiple hop IPv6 Session" in a transparent transmission manner. An IP edge node may include a BNG or a BRAS, and in each embodiment of the present invention, the IP edge node is illustrated by taking the BNG as an example. As shown in FIG. 4, "IP Session" keepalive monitoring between a UE and a BNG includes: The HGW forwards a BFD message sent between the UE and the BNG, in which a first discriminator field value in the BFD message is a difference between an IP address prefix of the UE and an IP address prefix of the HGW; the UE receives the BFD message, and monitors whether an IP session between the UE and the BNG is keepalive according to the first discriminator field value. For a downlink direction, the BNG sends the BFD message to the UE, and after receiving the message, the UE may determine that a corresponding "BFD Session" is keepalive according to a value of a "Discriminator" field in the message in combination with a predefined "BFD Session" identifier, and since the "BFD Session" is associated with the "IP Session," the UE may determine whether the "IP Session" is keepalive. The BNG receives a BFD message, and monitors whether the IP session between the BNG and the UE is keepalive according to the first discriminator field value in the BFD message. For an uplink direction, the UE sends the BFD message to the BNG, and after receiving the message, the BNG may determine whether a corresponding "IPv6 Session" is keepalive according to a value of a "Discriminator" field in the message in combination with a predefined "BFD Session" identifier.

The "IPv6 Session" keepalive monitoring between the HGW and the BNG includes: The HGW receives the BFD message sent by the BNG, and monitors whether an IP session between the HGW and the BNG is keepalive according to a second discriminator field value in the BFD message, in which the second discriminator field value is set to a special value, for example, "0" or "0xFFFF." In the downlink direction, the BNG sends the BFD message to the HGW, and the HGW may determine the corresponding "BFD Session" according to the value of the "Discriminator" field in the BFD message, and accordingly monitor a keepalive status of the associated "IP Session". The BNG receives a BFD message sent by the HGW, and monitors whether the IP session between the BNG and the HGW is keepalive according to source IP address related information and/or the second discriminator field value in the BFD message, in which the source IP address related information includes a source IP address or a source IP address prefix. In the uplink direction, after receiving the BFD message sent by the BNG, the HGW may determine the corresponding "BFD Session" according to a source IP address of the message, that is, a source IP address/prefix of the BNG, and/or the value of the "Discriminator" field in the BFD message, and accordingly monitor a keepalive status of the associated "IP Session."

Specifically, in the transparent transmission mode of the HGW:

The "BFD Session" adopted by "Keepalive" of the single hop "IPv6 Session" performs "Keepalive" interaction with an address of the HGW or an address of the BNG, and the "Discriminator" field of the BFD message is set to "0" or "0xFFFF."

The "BFD Session" adopted for "IPv6 Session Keepalive" of the multihop "IPv6 Session" performs "Keepalive" interaction with an address of the UE or an address of the BNG, and the "Discriminator" field value in the BFD message is set to (Yn-Z), where n=1, 2, 3 . . . , that is, a difference between a "Prefix Yn" and a "Prefix Z". For example, if the "Prefix Yn=2002:db8:200:122::/64," and the "Prefix Z=2002:db8:200:100::/56," Yn-Z=0x22, as shown in Table 1.

TABLE 1

|  | 0 to 15 bits | 15 to 31 bits | 32 to 47 bits | 48 to 55 bits | 56 to 63 bits |
| --- | --- | --- | --- | --- | --- |
| Prefix Yn | 0x2002 | 0x0db8 | 0x0200 | 0x01 | 0x22 |
| Prefix Z | 0x2002 | 0x0db8 | 0x0200 | 0x01 | 0x00 |
| Yn-Z | 0 | 0 | 0 | 0 | 0x22 |

The BNG/UE associates the "BFD Session" with a corresponding "IPv6 Session"/"IPv6 Session" group according to the "Discriminator" field value in the BFD message. The "Discriminator" field may include a "My Discriminator" or a "Your Discriminator" field. Additionally, under the same "Prefix Yn," a user may have a plurality of IP addresses, and a plurality of "IP Sessions," the plurality of "IP Sessions" may be used as an "IP Session" group to be associated with the "Discriminator" field value in the BFD message, that is, the "Discriminator" field of the BFD message may represent an "IP Session" group under the same "Prefix Yn," so the first discriminator field value is configured to identify one IP session or multiple IP sessions under the same IP address prefix of the UE.

Optionally, a source IP address prefix is configured to identify one IP session, and the single hop "BFD Session" uses the "Prefix Z" as an identifier of the "Session;" and the multihop "BFD Session" uses the "Prefix Z" or the "Prefix Yn" as an identifier of the "Session."

Taking FIG. 4 as an example, an "IP Session 0" may be identified with a "Prefix Z," and adopt a "BFD Session 0" to support "Keepalive," and the "Discriminator" field of the BFD message is set to "0" or "0xFFFF;" and the BNG/UE associates the "BFD Session 0" with a corresponding "IPv6 Session 0" according to the source IP address prefix "Prefix Z" and the "Discriminator" field value (0 or 0xFFFF) of the BFD message.

An "IP Session 1" may be identified with a "Prefix Y1," and adopt a "BFD Session 1" to support "Keepalive," and the "Discriminator" field of the BFD message is set to (Y1-Z); and the BNG/UE associates the "BFD Session 1" with a corresponding "IPv6 Session 1" according to the "Discriminator" field value (Y1-Z) of the BFD message.

An "IP Session n" may be identified with a "Prefix Yn," and adopt a "BFD Session n" to support "Keepalive," and the "Discriminator" field of the BFD message is set to (Yn-Z); and the BNG/UE associates the "BFD Session n" with a corresponding "IPv6 Session n" according to the "Discriminator" field value (Yn-Z) of the BFD message.

In still another embodiment of the present invention, an "IPv6 Session Keepalive Proxy" disposed on an HGW realizes keepalive monitoring of a "Multiple hop IPv6 Session" in a proxy mode. The proxy mode is: The HGW receives a detection message sent between a UE or a BNG, modifies a first discriminator field value in the detection message, and then forwarding the modified detection message to the BNG or the UE; and monitoring, by the UE or the BNG, whether an IP session between the BNG and the UE is keepalive according to the first discriminator field value in the detection message. For the proxy mode, different port settings of the HGW are introduced respectively.

A case of the proxy mode is as shown in FIG. 4. For the keepalive monitoring of the "IP Session" between the UE and the BNG, the modifying the first discriminator field value in the detection message, and then forwarding the modified detection message to the BNG or the UE specifically includes: receiving, by the HGW, the BFD message sent by the UE, modifying the first discriminator field value in the BFD message into the difference between the IP address prefix of the UE and the IP address prefix of the HGW, and then sending the modified BFD message to the BNG; The HGW receives the BFD message sent by the BNG, in which the first discriminator field value in the BFD message is the difference between the IP address prefix of the UE and the IP address prefix of the HGW, modifies the first discriminator field value into a value recognizable to the UE, and sends the modified BFD message to the UE. The "BFD Session" adopted for "IPv6 Session Keepalive" of the multihop "IPv6 Session" performs "Keepalive" interaction with an address of the user or an address of the BNG, and the "IPv6 Session Keepalive Proxy" modifies a value of a "Discriminator" field of a first hop BFD message into (Yn-Z), that is, a difference between the "Prefix Yn" and the "Prefix Z," and then forwards the message on a second hop; or the "IPv6 Session Keepalive Proxy" modifies the "Discriminator" field value (Yn-Z) of a second hop BFD message into a value recognizable to the UE/BNG, and then forwards the message on the first hop. Likewise, the BNG/UE associates the "BFD Session" with a corresponding "IPv6 Session" according to the "Discriminator" field value in the BFD message. The "Discriminator" field may include a "My Discriminator" or a "Your Discriminator" field. Additionally, under the same "Prefix Yn," a user may have a plurality of IP addresses, and a plurality of "IP Sessions," the plurality of "IP Sessions" may be used as an "IP Session" group to be associated with the "Discriminator" field value in the BFD message, that is, the "Discriminator" field of the BFD message may represent an "IP Session" group under the same "Prefix Yn." Optionally, the single hop "BFD Session" uses the "Prefix Z" as an identifier of the "Session;" and the multihop "BFD Session" uses the "Prefix Z" or the "Prefix Yn" as an identifier of the "Session."

The keepalive monitoring of the "IPv6 Session" between the HGW and the BNG is realized by the same method as the method in which the "IPv6 Session Keepalive Proxy" disposed on the HGW realizes the "Multiple hop IPv6 Session" in the transparent transmission manner, and the details are not described herein again.

Another case of the proxy mode is as shown in FIG. 5. FIG. 5 is a schematic diagram of an IP session keepalive monitoring method according to a second embodiment of the present invention. In this embodiment, an "IPv6 Session Keepalive Proxy" disposed on an HGW realizes keepalive monitoring of a "Multiple hop IPv6 Session" in a proxy manner, and a "Proxy" uses different WAN ports to correspond to different UE groups or IPv6 Session groups. For example, in FIG. 5, a WAN port 0 corresponds to User 1 to User n.

For the keepalive monitoring of the "IPv6 Session" between the UE and the BNG, the HGW receives a BFD or NUD message sent by the UE through a corresponding Local Area Network (LAN) port. For the BFD message, a keepalive monitoring message of a next hop is reconstructed, that is, both a source address and a destination address of the next hop monitoring message are changed; for example, in the uplink direction, the destination address is modified to the address of the BNG, and the source address is modified to the address of the HGW. The processing specifically includes: the first discriminator field value in the BFD message is modified to the difference between the IP address prefix of the UE and the IP address prefix of the HGW, and then the reconstructed BFD message including the modified first discriminator field value is sent to the BNG through a WAN port corresponding to the different LAN ports. For the NUD message, the HGW receives the NUD message sent by the UE, reconstructs a BFD message of a next hop, and sends the reconstructed BFD message to the BNG. In the downlink direction, the HGW receives the BFD message sent by the BNG through a WAN port, in which the first discriminator field value in the BFD message is the difference between the IP address prefix of the UE and the IP address prefix of the HGW, modifies the first discriminator field value to a value corresponding to the IP address prefix of the UE, reconstructs the BFD message, and sends the BFD message including the modified first discriminator field value to the UE through the corresponding LAN ports.

The "IPv6 Session" keepalive monitoring between the HGW and the BNG includes: The HGW receives the BFD message sent by the BNG, and monitors whether an IP session between the HGW and the BNG is keepalive according to a second discriminator field value in the BFD message, in which the second discriminator field value is set to a special value, for example, "0" or "0xFFFF." In the downlink direction, the BNG sends the BFD message to the HGW, and the HGW may determine the corresponding "BFD Session" according to the "Discriminator" field value in the BFD message, and accordingly monitor a keepalive status of the associated "IP Session." The BNG receives the BFD message sent by the HGW, and monitors whether the IP session between the BNG and the HGW is keepalive according to the second discriminator field value in the BFD message. In the uplink direction, after receiving the BFD message sent by the BNG, the HGW may determine the corresponding "BFD Session" according to the "Discriminator" field value in the BFD message, and accordingly monitor a keepalive status of the associated "IP Session."

Specifically, the "BFD Session" adopted for "Keepalive" of the single hop "IPv6 Session" performs "Keepalive" interaction with an address of the HGW or an address of the BNG, and the "Discriminator" field of the BFD message is set to a special value, for example, "0" or "0xFFFF."

The "IPv6 Session Keepalive" of the multihop "IPv6 Session" is completed by adopting two single hops. Through a "Keepalive" procedure in which the "Proxy" relays the first hop and the second hop, the "Keepalive" status synchronization between the first hop and the second hop is maintained, and the "Discriminator" field of the "BDF Session" may be set or modified through the "Proxy."

The first hop performs the "keepalive" by adopting the single hop "NUD/BFD Session", and the second hop performs the "keepalive" by adopting the single hop "BFD Session."

The single hop "NUD/BFD Session" adopted by the first hop performs the "Keepalive" interaction with the address of the user or the "Proxy" address, in which, the "Proxy" address may be an LAN port address of the HGW, and the "Discriminator" field of the BFD message is set to a value corresponding to the "Prefix Yn" (n=1, 2, 3, . . . ). For example, it is recommended to use the last 32 bits of the "Prefix Yn" as the "Discriminator" field value, or the value is (Yn-Z), where n=1, 2, 3 . . . .

In the first hop, the UE/HGW associates the "BFD Session" with a corresponding "IPv6 Session" according to the "Discriminator" field value in the BFD message.

The single hop "BFD Session" adopted by the second hop performs the "Keepalive" interaction with the address of the BNG or the Proxy address, in which the Proxy address may be a WAN port address of the HGW, and the "Discriminator" field of the BFD message is set to (Yn-Z), where n=1, 2, 3 . . . that is, the difference between the "Prefix Yn" and the "Prefix Z."

The "IPv6 Session Keepalive Proxy" modifies a value of a "Discriminator" field of a first hop BFD message to (Yn-Z), and then forwards the message on the second hop; or the "IPv6 Session Keepalive Proxy" modifies the "Discriminator" field value (Yn-Z) of a second-hop BFD message to a value corresponding to the "Prefix Yn", and then forwards the message on the first hop.

In the second hop, the BNG/HGW associates the "BFD Session" with a corresponding "IPv6 Session" according to the source IP address/prefix and/or the "Discriminator" field value in the BFD message. The "Proxy" uses different WAN ports to correspond to different UE groups or IPv6 Session groups, and under the same WAN port, the BNG/HGW distinguishes "IPv6 Sessions" or "IPv6 Session" groups of different users according to the "Discriminator" field value in the BFD message.

Optionally, the single hop "BFD Session" uses the "Prefix Z" as an identifier of the "Session"; and the multihop "BFD Session" uses the "Prefix Z" or the "Prefix Yn" as an identifier of the "Session."

Taking FIG. 5 as an example, an "IP Session 0" may be identified with a "Prefix Z", and adopt a "BFD Session 0" to support "Keepalive," and the "Discriminator" field of the BFD message is set to "0" or "0xFFFF;" and the BNG/UE associates the "BFD Session 0" with a corresponding "IPv6 Session 0" according to the source IP address prefix "Prefix Z" and the "Discriminator" field value (0 or 0xFFFF) of the BFD message.

An "IP Session 1" may be identified with a "Prefix Y1," and adopt a "BFD Session 11" and the "BFD Session 0" to support "Keepalive," and the "Discriminator" field of the "BFD Session 0" message is set to (Y1-Z); the BNG/HGW associates the "BFD Session 0" with a corresponding "IPv6 Session 1" according to the source IP address prefix "Prefix Z" and the "Discriminator" field value (Y1-Z) of the BFD message; and the HGW/UE associates the "BFD Session 11" with a corresponding "IPv6 Session 1" according to the source IP address prefix "Prefix Y1" of the BFD message.

An IP Session n may be identified with a "Prefix Yn," and adopt a "BFD Session 1n" and the "BFD Session 0" to support "Keepalive," and the "Discriminator" field of the "BFD Session 0" message is set to (Yn-Z); and the "Discriminator" field of the "BFD Session 1n" message is set to the last 32 bits of the "Prefix Yn." The BNG/HGW associates the "BFD Session 0" with a corresponding "IPv6 Session n" according to the source IP address prefix "Prefix Z" and the "Discriminator" field value (Yn-Z) of the BFD message; and the HGW/UE associates the "BFD Session 1n" with a corresponding "IPv6 Session n" according to the source IP address prefix "Prefix Yn" of the BFD message.

In the procedure of forwarding the detection message and monitoring the keepalive of the "IPv6 Session," the HGW further performs an operation of status synchronization of session peers. The operation includes: yhe "Proxy" collects a diagnostic code (BFD diagnostic code) or an NUD status of one hop in the "IP Session", and performs expression on the other hop through the diagnostic code (BFD diagnostic code) or the NUD status.

Taking FIG. 5 as an example, when both the first hop and the second hop are the "BFD Session," in the uplink direction, the "Proxy" is in charge of replicating a "diagnostic code" value of the BFD message of the first hop to a "diagnostic code" field of the BFD message of the second hop, or the "Proxy" is in charge of diagnosing a keepalive status of a session peer 1 (Peer1) of the first hop, then generating a corresponding diagnostic code (BFD diagnostic code) for the keepalive status of the session peer 1 (Peer1), and notifying a session peer 2 (Peer2) through a BFD message. The BNG distinguishes keepalive status of "IPv6 Sessions" of different users according to the "Discriminator" field value in the BFD message; and in the downlink direction, the "Proxy" is in charge of replicating a "diagnostic code" value of the BFD message of the second hop to a "diagnostic code" fields of the first-hop BFD messages of all "IP Sessions," or the "Proxy" is in charge of diagnosing the keepalive status of the session peer 2 (Peer2) of the second hop, then generating a corresponding diagnostic code (BFD diagnostic code) for the keepalive status of the session peer 2 (Peer2), and notifying the session peer 1 (Peer1) of all "IP Sessions" of the diagnostic code through a BFD message of the first hop.

When one hop is the NUD while the other hop is the "BFD Session", in the uplink direction, the "Proxy" is in charge of diagnosing the keepalive status of the session peer 1 (Peer1) of the first hop through an NUD mechanism, then generating a corresponding diagnostic code (BFD diagnostic code) for the keepalive status of the first hop, and notifying the session peer 2 (Peer2) through a BFD message. The BNG distinguishes keepalive status of "IPv6 Sessions" of different users according to the "Discriminator" field value in the BFD message; for example, after sending a Neighbor Solicitation (NS) message to the Peer 1, if the "Proxy" does not receive a Neighbor Advertisement (NA) message answered by the Peer 1 in a given time, the "Proxy" generates a corresponding diagnostic code (BFD diagnostic code), such as "diagnostic code=1" indicating Control Detection Time Expired, "diagnostic code=2" indicating Echo Function Failed or "diagnostic code=3" indicating Neighbor Signaled Session Down of the Peer 1, and then notifies the Peer2 through a BFD message.

Alternatively, when one hop is the NUD while the other hop is the "BFD Session," in the downlink direction, the "Proxy" is in charge of generating a corresponding NUD action on the first hops of all "IP Sessions" according to the "diagnostic code" value of the BFD message of the second hop. For example, when the "diagnostic code" of the BFD message of the second hop indicates Neighbor Signaled Session Down, Path Down, Control Detection Time Expired, Echo Function Failed, Forwarding Plane Reset or Administratively Down of the Peer 2, the "Proxy" indicates neighbor unreachable to Peers of all "IP Sessions" through the NUD, for example, after receiving the NS message of the Peer 1, the "Proxy" may not return the NA message to the Peer 1, or the "Proxy" stops actively initiating the NS message to the Peer 1.

Still another case of the proxy mode is as shown in FIG. 6. FIG. 6 is a schematic diagram of an IP session keepalive monitoring method according to a third embodiment of the present invention. In this embodiment, an "IPv6 Session Keepalive Proxy" disposed on an HGW realizes keepalive monitoring of a "Multiple hop IPv6 Session" in a proxy manner, and a Proxy uses different WAN ports to correspond to different UEs or IPv6 Sessions. For example, in FIG. 6, a WAN port 1 corresponds to a user 1, and a WAN port n corresponds to a user n.

For the keepalive monitoring of the "IPv6 Session" between the UE and the BNG, the HGW receives a BFD or NUD message sent by the UE through an LAN port. For the BFD message, a keepalive monitoring message of a next hop is reconstructed, that is, both a source address and a destination address of the next hop monitoring message are changed. For example, in the uplink direction, the destination address is modified to the address of the BNG, and the source address is modified to the address of the HGW, which specifically includes: The first discriminator field value in the BFD message is modified into a value corresponding to the IP address prefix of the UE, and then the reconstructed BFD message including the modified first discriminator field value is sent to the BNG through a WAN port corresponding to the LAN port. For the NUD message, the HGW receives the NUD message sent by the UE, reconstructs a BFD message of a next hop, and sends the reconstructed BFD message to the BNG. In the downlink direction, the HGW receives the BFD message sent by the BNG through a WAN port, in which the first discriminator field value in the BFD message is a value corresponding to the IP address prefix of the UE, reconstructs a BFD or NUD message, and sends the NUD message or the BFD message including the first discriminator field value to the UE through an LAN port corresponding to the WAN port.

The "IPv6 Session" keepalive monitoring between the HGW and the BNG includes: The HGW receives the BFD message sent by the BNG, and monitors whether an IP session between the HGW and the BNG is keepalive according to a second discriminator field value in the BFD message, in which the second discriminator field value is set to a special value, for example, "0" or "0xFFFF". In the downlink direction, the BNG sends the BFD message to the HGW, and the HGW may determine the corresponding "BFD Session" according to the "Discriminator" field value in the BFD message, and accordingly monitor a keepalive status of the associated "IP Session." The BNG receives the BFD message sent by the HGW, and monitors whether the IP session between the BNG and the HGW is keepalive according to the second discriminator field value in the BFD message. In the uplink direction, after receiving the BFD message sent by the BNG, the HGW may determine the corresponding "BFD Session" according to the "Discriminator" field value in the BFD message, and accordingly monitor a keepalive status of the associated "IP Session."

Specifically, the "BFD Session" adopted by "Keepalive" of the single hop "IPv6 Session" performs "Keepalive" interaction with an address of the HGW or an address of the BNG, and the "Discriminator" field of the BFD message is set to "0" or "0xFFFF."

The "IPv6 Session Keepalive" of the multihop "IPv6 Session" is completed by adopting two single hops. Through a "Keepalive" procedure in which the "Proxy" relays the first hop and the second hop, the "Keepalive" status synchronization between the first hop and the second hop is maintained.

The first hop performs the "keepalive" by adopting the single hop "NUD/BFD Session", and the second hop performs the "keepalive" by adopting the single hop "BFD Session."

The single hop "NUD/BFD Session" adopted by the first hop performs the "Keepalive" interaction with the address of the user or the "Proxy" address, in which the "Proxy" address may be an LAN port address of the HGW, and the "Discriminator" field of the BFD message is set to a value corresponding to the "Prefix Yn" (n=1, 2, 3, . . . ). For example, the last 32 bits of the "Prefix Yn" are used as the "Discriminator" field value, or the value is (Yn-Z), where n=1, 2, 3, . . . .

In the first hop, the UE/HGW associates the "BFD Session" with a corresponding "IPv6 Session" according to the "Discriminator" field value in the BFD message.

The single hop "BFD Session" adopted by the second hop performs the "Keepalive" interaction with the address of the BNG or the "Proxy" address, in which the "Proxy" address may be a WAN port address of the HGW, and the "Discriminator" field of the BFD message is set to a value corresponding to the "Prefix Yn" (n=1, 2, 3, . . . ). For example, the last 32 bits of the "Prefix Yn" are used as the "Discriminator" field value, or the value is (Yn-Z), where n=1, 2, 3, . . . .

In the second hop, the BNG/HGW associates the "BFD Session" with a corresponding "IPv6 Session" according to the source IP address/prefix and/or the "Discriminator" field value in the BFD message. The "Proxy" corresponds to different UEs or IPv6 Sessions by adopting different WAN ports, and the BNG/HGW distinguishes "IPv6 Sessions" of different users according to the "Discriminator" field value in the BFD message.

Optionally, the single hop "BFD Session" uses the "Prefix Z" as an identifier of the "Session"; and the multihop "BFD Session" uses the "Prefix Z" or the "Prefix Yn" as an identifier of the "Session."

Taking FIG. 6 as an example, an "IP Session 0" may be identified with a "Prefix Z", and adopt a "BFD Session 0" to support "Keepalive," and the "Discriminator" field of the BFD message is set to "0" or "0xFFFF;" and the BNG/UE associates the "BFD Session 0" with a corresponding "IPv6 Session 0" according to the source IP address prefix "Prefix Z" of the BFD message.

An "IP Session 1" may be identified with a "Prefix Y1", and adopt a "BFD Session 11" and a "BFD Session 21" to support "Keepalive", and the "Discriminator" field of the "BFD Session 21" message is set to (Y1-Z); the BNG/HGW associates the "BFD Session 21" with a corresponding "IPv6 Session 1" according to the source IP address prefix "Prefix Y1" of the BFD message; and the HGW/UE associates the "BFD Session 11" with a corresponding "IPv6 Session 1" according to the source IP address prefix "Prefix Y1" of the BFD message.

An "IP Session n" may be identified with a Prefix Yn, and adopt a "BFD Session 1n" and a "BFD Session 2n" to support "Keepalive", and the "Discriminator" field of the "BFD Session 2n" BFD message is set to (Yn-Z); and the "Discriminator" field of the "BFD Session 1n" BFD message is set to the last 32 bits of the "Prefix Yn". The BNG/HGW associates the "BFD Session 2n" with a corresponding "IPv6 Session n" according to the source IP address prefix "Prefix Yn" of the BFD message; and the HGW/UE associates the "BFD Session 1n" with a corresponding "IPv6 Session n" according to the source IP address prefix "Prefix Yn" of the BFD message.

In the procedure of forwarding the detection message and monitoring the keepalive of the "IPv6 Session", the HGW further performs an operation of status synchronization of session peers. The operation may include: The "Proxy" collects a diagnostic code (BFD diagnostic code) or an NUD status such as neighbor unreachable of one hop in the "IP Session", and performs expression on the other hop through the diagnostic code (BFD diagnostic code) or the NUD.

For example, when both the first hop and the second hop are the "BFD Session", the "Proxy" is in charge of replicating a "diagnostic code" value of the BFD message of one hop to a "diagnostic code" field of the BFD message of the other hop, or the "Proxy" is in charge of diagnosing a keepalive status of a session peer 1 (Peer1) of one hop, then generating a corresponding diagnostic code (BFD diagnostic code) for the keepalive status of the session peer 1 (Peer1), and notifying a session peer 2 (Peer2) through a BFD message.

When one hop is the NUD while the other hop is the "BFD Session", in the uplink direction, the "Proxy" is in charge of diagnosing the keepalive status of the session peer 1 (Peer1) of the first hop through an NUD mechanism, then generating a corresponding diagnostic code (BFD diagnostic code) for the keepalive status of the first hop, and notifying the session peer 2 (Peer2) through a BFD message; and for example, after sending an NS message to the Peer 1, if the "Proxy" does not receive an NA message answered by the Peer 1 in a given time, the "Proxy" generates a corresponding diagnostic code (BFD diagnostic code), such as "diagnostic code=1" indicating Control Detection Time Expired, "diagnostic code=2" indicating Echo Function Failed) or "diagnostic code=3" indicating Neighbor Signaled Session Down of the Peer 1, and then notifies the Peer2 through a BFD message.

Alternatively, when one hop is the NUD while the other hop is the "BFD Session", in the downlink direction, the "Proxy" is in charge of generating a corresponding NUD action on the first hop according to the "diagnostic code" value of the BFD message of the second hop. For example, when the "diagnostic code" of the BFD message of the second hop indicates Neighbor Signaled Session Down of the Peer 2, Path Down, Control Detection Time Expired, Echo Function Failed, Forwarding Plane Reset or Administratively Down, the "Proxy" indicates neighbor unreachable to the Peer 1 through the NUD, for example, after receiving the NS message of the Peer 1, the "Proxy" may not return the NA message to the Peer 1, or the "Proxy" stops actively initiating the NS message to the Peer 1.

In the IP session keepalive monitoring method according to the embodiment of the present invention, "Multihop BFD" is used as a keepalive monitoring mechanism of a "Multihop IPv6 Session", or an "IPv6 Session Keepalive Proxy" is disposed on the HGW, so that an "IPv6 Session" can be established between the UE following the HGW and the IP edge node, and a "Single hop IP Session" can be extended to a "Multihop IP Session", thereby realizing keepalive monitoring of the "Multiple hop IPv6 Session".

Persons of ordinary skill in the art may understand that all or part of the steps of the method according to the embodiments may be implemented by a program instructing relevant hardware. The program may be stored in a computer readable storage medium. When the program is executed, the steps of the method according to the embodiments are performed. The storage medium may be any medium that is capable of storing program codes, such as a Read-Only Memory (ROM), a Random Access Memory (RAM), a magnetic disk, or an optical disk.

Figure 7:
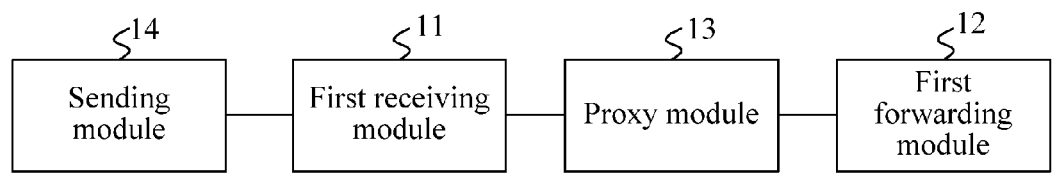
FIG. 7 is a schematic structural diagram of an HGW according to an embodiment of the present invention.

FIG. 7 is a schematic structural diagram of an HGW according to an embodiment of the present invention. As shown in FIG. 7, the HGW includes a first receiving module 11 and a first forwarding module 12, in which the first receiving module 11 is configured to receive a BFD message sent by a UE or an IP edge node; and the first forwarding module 12 is configured to send the BFD message including a first discriminator field value to the IP edge node or the UE according to the BFD message received by the first receiving module, in which the first discriminator field value is a difference between an IP address prefix of the UE and an IP address prefix of the HGW. Specifically, the first receiving module 11 receives the BFD message sent by the UE or a BNG, and if the first discriminator field value in the BFD message is the difference between the IP address prefix of the UE and the IP address prefix of the HGW, the BFD message is directly forwarded to the UE or the BNG; and if the first discriminator field value in the BFD message is not the difference between the IP address prefix of the UE and the IP address prefix of the HGW, the first discriminator field value is modified to the difference between the IP address prefix of the UE and the IP address prefix of the HGW, the modified BFD message is forwarded to the UE or the BNG.

The HGW according to this embodiment further includes a proxy module 13, configured to modify the first discriminator field value in the BFD message received by the first receiving module 11. Specifically, to enable the HGW, as a "Router," to realize the keepalive monitoring of the "IP Session" between the UE connected to the HGW and the IP edge node such as the BNG, a proxy function is added in the HGW, and the relay from the first hop to the second hop is realized through the proxy. The first receiving module 11 receives a BFD detection message sent by the UE or the BNG, and the proxy module 13 modifies a discriminator field value in the detection message according to the actual situation so that the message is suitable of being transported in a next hop, thereby achieving the purpose of keepalive monitoring. After modifying the discriminator field value, the proxy module 13 sends the detection message including the modified discriminator field value to a destination end, which may be the UE or the BNG, of a next hop through the first forwarding module 12.

The HGW according to this embodiment further includes a sending module 14, configured to send a detection message including a second discriminator field value to the BNG, in which the second discriminator field value is "0" or "0xFFFF." The HGW realizes the session keepalive monitoring between the HGW and the BNG through the sending module 14.

In the HGW according to this embodiment, an "IPv6 Session Keepalive Proxy" is disposed on the HGW, so that an "IPv6 Session" can be established between the UE following the HGW and the IP edge node, and a "Single hop IP Session" can be extended to a "Multihop IP Session," thereby realizing keepalive monitoring of the "Multiple hop IPv6 Session."

Figure 8:
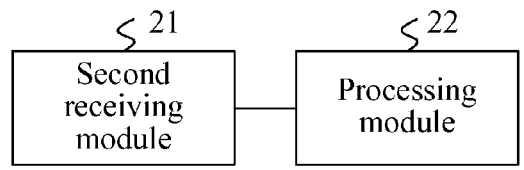
FIG. 8 is a schematic structural diagram of a network device according to an embodiment of the present invention.

FIG. 8 is a schematic structural diagram of a network device according to an embodiment of the present invention. As shown in FIG. 8, the network device includes a second receiving module 21 and a processing module 22. The network device receives, through the second receiving module 21, a BFD message sent by an HGW, in which a first discriminator field value included in the BFD message is a difference between an IP address prefix of a UE and an IP address prefix of the HGW; and then monitors, through the processing module 22, whether an IP session between an IP edge node and the UE is keepalive according to the first discriminator field value in the BFD message. The processing module is further configured to determine whether a BFD session corresponding to the first discriminator field value is keepalive according to the first discriminator field value in the BFD message, and determine whether an IP session associated with the BFD session is keepalive according to whether the BFD session is keepalive.

The network device according to this embodiment may be the UE or a BNG, which performs the keepalive monitoring on an "IPv6 Session" between the UE and the BNG through a BFD message sent by the HGW.

Figure 9:
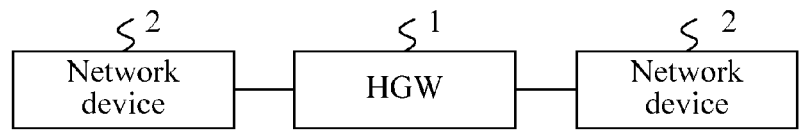
FIG. 9 is a schematic structural diagram of an IP session keepalive monitoring system according to an embodiment of the present invention.

FIG. 9 is a schematic structural diagram of an IP session keepalive monitoring system according to an embodiment of the present invention. As shown in FIG. 9, the IP session keepalive monitoring system includes an HGW 1 and a network device 2. The HGW 1 is configured to send a BFD message to the network device, in which a first discriminator field value in the BFD message is a difference between an IP address prefix of a UE and an IP address prefix of the HGW; and the network device 2 is configured to receive the BFD message sent by the HGW, and monitor whether an IP session between an IP edge node and the UE is keepalive according to the first discriminator field value in the BFD message.

The HGW and the network device involved in the IP session keepalive monitoring system according to this embodiment providing may adopt the HGW and the network device according to the foregoing embodiments, and the details are not described herein again.

In the IP session keepalive monitoring system according to this embodiment, an "IPv6 Session Keepalive Proxy" is disposed on the HGW, so that an "IPv6 Session" can be established between the UE following the HGW and the IP edge node, and a "Single hop IP Session" can be extended to a "Multihop IP Session," thereby realizing keepalive monitoring of the "Multiple hop IPv6 Session."

Finally, it should be noted that the foregoing embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, and such modifications or replacements do not depart from the spirit and scope of the technical solutions according to the embodiments of the present invention.

What is claimed is:

1. An Internet Protocol (IP) session keepalive monitoring method, comprising: receiving, by a User Equipment (UE) or an IP edge node, a Bidirectional Forwarding Detection (BFD) message sent by a Home Gateway (HGW), wherein a first discriminator field value comprised in the BFD message is a difference between an IP address prefix of the UE and an IP address prefix of the HGW; and monitoring, by the UE or the IP edge node, whether an IP session between the IP edge node and the UE is keepalive according to the first discriminator field value in the BFD message; wherein, the UE is connected via the HGW to the IP edge node.

2. The IP session keepalive monitoring method according to claim 1, wherein the monitoring whether an IP session between the IP edge node and the UE is keepalive comprises: determining whether a BFD session corresponding to the first discriminator field value is keepalive according to the first discriminator field value in the BFD message, and determining whether the IP session associated with the BFD session is keepalive according to whether the BFD session is keepalive.

3. The IP session keepalive monitoring method according to claim 2, wherein the BFD message further comprises a second discriminator field value, and the second discriminator field value is "0" or "0xFFFF".

4. The IP session keepalive monitoring method according to claim 3, further comprising: monitoring, by the HGW or the IP edge node, whether an IP session between the IP edge node and the HGW is keepalive according to the second discriminator field value in the BFD message.

5. The IP session keepalive monitoring method according to claim 2, wherein before the receiving, by the UE or the IP edge node, the BFD message sent by the HGW, the method further comprises: modifying, by the HGW, the first discriminator field value comprised in the BFD message to the difference between the IP address prefix of the UE and the IP address prefix of the HGW, and then forwarding the modified BFD message to the UE or the IP edge node.

6. A Home Gateway (HGW), comprising: a receiving module, configured to receive a Bidirectional Forwarding Detection (BFD) message sent by a User Equipment (UE) or an Internet Protocol (IP) edge node wherein the UE is connected via the HGW to the IP edge node; and a forwarding module, configured to send a BFD message comprising a first discriminator field value to the IP edge node or the UE according to the BFD message received by the receiving module, wherein the first discriminator field value is a difference between an IP address prefix of the UE and an IP address prefix of the HGW.

7. The HGW according to claim 6, further comprising: a proxy module, configured to modify the BFD message received by the receiving module to the BFD message comprising the first discriminator field value.

8. The HGW according to claim 6, further comprising: a sending module, configured to send a BFD message comprising a second discriminator field value to the IP edge node, wherein the second discriminator field value is "0" or "0xFFFF".

9. The HGW according to claim 7, wherein: the proxy module is further configured to collect a diagnostic code or a Neighbor Unreachable Detection (NUD) status in one hop of an IP session, and sending the diagnostic code or the NUD status to a session peer in another hop of the IP session through the BFD message.

10. A network device, comprising: a receiving module, configured to receive a Bidirectional Forwarding Detection (BFD) message sent by a Home Gateway (HGW), wherein a first discriminator field value comprised in the BFD message is a difference between an Internet Protocol (IP) address prefix of a User Equipment (UE) and an IP address prefix of the HGW; and a processing module, configured to monitor whether an IP session between an IP edge node and the UE is keepalive according to the first discriminator field value in the BFD message; wherein, the network device is the IP edge node, and the UE is connected via the HGW to the IP edge node.

11. The network device according to claim 10, wherein the processing module is further configured to determine whether a BFD session corresponding to the first discriminator field value is keepalive according to the first discriminator field value in the BFD message, and determine whether an IP session associated with the BFD session is keepalive according to whether the BFD session is keepalive.

* * * * *